Patented Jan. 9, 1934

1,942,833

UNITED STATES PATENT OFFICE 1,942,833

PRODUCTION OF HIGH-QUALITY WAX-LIKE SUBSTANCES

Wilhelm Pungs, Ludwigshafen - on - the - Rhine, and Michael Jahrstorfer, Mannheim, Germany, assignors to I. G. Farbenindustrie Aktiengesellschaft, Frankfort-on-the-Main, Germany No Drawing. Application June 23, 1931, Serial No. 546,426, and in Germany July 3, 1930

10 Claims. (Cl. 134—15)

The present invention relates to the production of high-quality wax-like substances.

We have found that high-quality wax-like substances, i. e. substances having the physical properties of waxes of natural origin, such as carnauba wax or beeswax, are obtained when Montan wax, i. e. crude or deresinified Montan wax or bleached Montan wax, is wholly or partly converted into fatty acids by a treatment with oxidizing agents for example according to applicants' U. S. Patent No. 1,777,766 or by steam distilation, the carboxylic acids, if desired in the form of their methyl or ethyl esters, being then reduced to alcohols and the latter esterified with one or more non-aromatic mono-carboxylic acids containing up to 25, preferably from 10 to 25, carbon atoms. The acids in Montan wax are mainly carboceric and montanic acid with 27, and 29 respectively, carbon atoms. The alcohols obtained therefrom correspond apparently to the structure of the acids; for the sake of brevity the mixture of alcohols formed by the reduction of the acids will be referred to in the following and in the claims as "montanol".

As acids for the esterification may be mentioned, for example, the fatty acids, such as formic, acetic, lactic or butyric acids and especially those of high molecular weight, as for example vegetal, i. e. vegetable or animal acids, such as stearic acid, palmitic acid, acids from wool fat, linoleic, ricinoleic or resinic acids in the pure or crude state, as for example colophony, cycloaliphatic naphthenic acids and like non-aromatic mono-carboxylic acids of high molecular weight as well as mixtures of these acids. Depending on the selection of the acids employed for the esterification, it is possible to prepare wax-like substances having any desired hardness. If desired, the esterification may be accelerated by adding a small quantity of the usual esterification catalysts, such as strong inorganic acids, as for example sulphuric acid, especially on working with carboxylic acids of high molecular weight.

One or more other alcohols, as for example palmityl alcohol, butyl alcohol or glycols, glycerine and/or other organic compounds containing hydroxyl groups, such as castor oil, fatty acids, hydroxy-ketones, as for example dihydroxy acetone, hydroxy-aldehydes, as for example salicyl or glycollic aldehydes and like hydroxyl-bearing organic compounds, or mixtures of the same, may be added to the montanol obtained by reduction of the carboxylic acids from Montan wax, before the esterification. Especially valuable products are obtained when the carboxylic groups of the acids in a certain quantity of initial material employed are partly esterified with the montanol and mixtures thereof with other hydroxyl-bearing organic compounds and partly converted into soaps by treatment with bases, such as alkali bases, for example ammonia or sodium hydroxide, metal bases, as for example zinc oxide, alkaline earth metal bases, such as calcium hydroxide, or organic bases, as for example triethanolamine and like organic or inorganic basic agents.

The products thus obtained may be mixed in any desired proportion with organic compatible adulterants, such as other waxes, as for example beeswax or japan wax or wax-like substances, such as purified ozokerite, or products obtainable according to the U. S. applications of one of the present inventors with others No. 247,454, filed January 17, 1928, and Nos. 352,903 and 352,-904, filed April 5, 1929, fats, oils, resins, as for example paraffin wax tallow or cotton, olive, sesamum or turpentine oils, colophony, aliphatic alcohols, such as butanol, mineral oil fractions, and like compatible additions and/or with perfumes or ethereal oils.

The products prepared according to this invention are especially suitable for the preparation of shoe creams, floor and boot polishes, agents for polishing lacquer coatings, glazing papers and like purposes. They are distinguished by great capacity for easily homogenizing with turpentine or mineral oils and by very high polishing action. They are differentiated from natural esters of alcohols of very high molecular weight in that they possess a higher hardness than natural esters of, say, myricyl alcohol, containing 30 carbon atoms, notwithstanding the lower number of carbon atoms in the alcoholic component.

In order to produce a good shining surface, such as is desirable with shoe creams for example, it is preferable to add to the esterified, or partly esterified and partly saponified, products, free alcohols of high molecular weight, such as may be obtained from natural waxes or from fatty acids of high molecular weight, that is containing at least 10 carbon atoms, by catalytic reduction of the carboxyl groups, or to carry out the esterification in the presence of a quantity of the alcohols of high molecular weight, such as cetyl, decyl or myricyl alcohols, exceeding that required for esterification.

The following examples will further illustrate the nature of this invention but the invention is not restricted to these examples. The parts are by weight.

Example 1

The acids of a deresinified Montan wax bleached according to Example 4 of Patent No. 1,777,766 are esterified with methyl alcohol in any known and convenient manner. 100 parts of the ester having a saponification value of 162 are heated to from 180° to 200° C. in an autoclave together with about 0.2 part of nickel deposited on about 2 parts of kieselguhr while introducing hydrogen and thereby keeping the pressure at about 200 atmospheres. After 25 hours the pressure is released and the hot reaction product is separated from the catalyst by filtration. After cooling it is saponified by treating it in an autoclave at about 150° C. with an aqueous 50 per cent caustic soda solution and the alcohols are recovered by extraction with the aid of ligroin. 22 parts of the resulting alcohol mixture having a hydroxyl value of 150 is esterified by stirring with 15 parts of pure palmitic acid and 10 drops of an aqueous 50 per cent sulphuric acid per each 370 grams of the said mixture at 120° C. for 3 hours in a closed vessel the free space of which is filled with nitrogen. A hard, pale wax is obtained which after washing possesses an acid value of 16.8 and a melting point of about 67.5. (Beeswax-myricyl palmitate has a melting point of from 63 to 65° C.)

Example 2

50 parts of the alcohols of high molecular weight obtained by reduction, in the manner described in Example 1, of the carboxylic acids obtained by distillation of crude Montan wax with superheated steam at about 50 millimeters mercury gauge, and 50 parts of 1.3-butylene glycol are esterified by heating them to 130° C. while stirring for 5 hours with the equimolecular amount of a mixture of 2 parts of palmitic acid and 1 part of fatty acids from wool fat. 100 parts of the resulting product are fused with 10 parts of paraffin wax, 2 parts of wool fat and 20 parts of beeswax. A soft pliant product is obtained.

Example 3

172 parts of an alcohol mixture prepared as described in Example 1 but having a hydroxyl value of 105 are stirred for 2 hours at 120° C. under nitrogen with 73 parts of palm kernel oil fatty acids having an acid value of 246 and 0.02 parts of aqueous sulphuric acid. After washing a pale yellowish, soft wax having a melting point of about 61.5° C. and an acid value of 22 is obtained.

Example 4

200 parts of the alcohol mixture from Montan wax according to Example 1 are refluxed for 4 hours with 128 parts of pure formic acid, whereupon the remainders of formic acid are distilled off and the product is fused with water until it shows neutral reaction. A pale yellowish wax of medium hardness, an acid value of 0.7, a saponification value of 112 and a melting point of 62° C. is obtained.

Example 5

200 parts of the alcohol mixture from Montan wax according to Example 1 are heated with 100 parts of lactic acid for 10 hours to 120° C. while passing through a current of nitrogen. After fusing the resulting product with water until it shows a neutral reaction, a pale yellowish wax of medium hardness, an acid value of 5.6, a saponification value of 141.4 and a melting point of 66° C. is obtained.

Example 6

130 parts of montanol with a hydroxyl value of 101 are stirred under nitrogen with 20 parts of crotonic acid (acid value 722) and 10 drops of aqueous sulphuric acid per 1.5 kilograms of the mixture. After washing with water, a yellowish wax of medium hardness, an acid value of 6.3 and a melting point of 65° C. is obtained.

Example 7

62 parts of montanol having a hydroxyl value of 117, are heated to 120° C. with 38 parts of linoleic acid (acid value 182) and 0.07 part of an aqueous 50 per cent sulphuric acid while passing through a current of nitrogen. After 4½ hours the acid value is decreased to 24 and a pale-brownish, pliable wax is obtained which is soluble in linseed oil warmed to about 80° C.

Example 8

130 parts of montanol having a hydroxyl value of 117, 100 parts of ricinoleic acid and 0.14 part of an aqueous 50 per cent sulphuric acid are heated to 120° C. while passing through a current of nitrogen; after 5 hours the mixture is worked up. A pale colored, kneadable soft wax is obtained, which melts at about 62° C.

What we claim is:

1. As new articles of manufacture synthetic wax preparations comprising an ester of montanol with at least one non-aromatic mono-carboxylic acid containing up to 25 carbon atoms.

2. As new articles of manufacture synthetic wax preparations comprising an ester of montanol with an aliphatic open chain mono-carboxylic acid containing up to 25 carbon atoms.

3. As new articles of manufacture synthetic wax preparations comprising an ester of montanol with an aliphatic open chain mono-carboxylic acid containing from 10 to 25 carbon atoms.

4. As new articles of manufacture synthetic wax preparations comprising an ester of montanol with a vegetal fatty acid.

5. As new articles of manufacture synthetic wax preparations comprising an ester of montanol with an animal fatty acid.

6. As new articles of manufacture synthetic wax preparations comprising an ester of montanol with a vegetable fatty acid.

7. As new articles of manufacture synthetic wax preparations comprising an ester of montanol with an aliphatic hydroxy- mono-carboxylic acid containing up to 25 carbon atoms.

8. As new articles of manufacture synthetic wax preparations comprising an ester of montanol with palmitic acid.

9. As new articles of manufacture synthetic wax preparations comprising an ester of montanol with linoleic acid.

10. As a new article of manufacture an ester of montanol with a non-aromatic mono-carboxylic acid containing up to 25 carbon atoms.

WILHELM PUNGS.
MICHAEL JAHRSTORFER.